(12) United States Patent  
Wendel

(10) Patent No.: US 9,127,700 B2  
(45) Date of Patent: Sep. 8, 2015

(54) PLUG-TYPE MOUNTING

(75) Inventor: Sebastian Wendel, Berlin (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 725 days.

(21) Appl. No.: 13/473,675

(22) Filed: May 17, 2012

(65) Prior Publication Data

US 2013/0142586 A1 Jun. 6, 2013

Related U.S. Application Data

(60) Provisional application No. 61/486,886, filed on May 17, 2011.

(30) Foreign Application Priority Data

May 17, 2011 (DE) .......................... 10 2011 076 009

(51) Int. Cl.
*E05C 9/06* (2006.01)
*F16B 5/06* (2006.01)
*F16B 21/02* (2006.01)
*F16B 21/16* (2006.01)

(52) U.S. Cl.
CPC . *F16B 5/06* (2013.01); *F16B 21/02* (2013.01); *F16B 21/16* (2013.01)

(58) Field of Classification Search
CPC .............. E05C 9/00; E05C 9/06; E05C 9/14; E05B 2015/0235; E05B 2015/0496; F16L 37/10; F16L 37/101; F16B 21/186

USPC .................. 403/321, 322.1, 322.4, 324, 325; 70/32–34; 285/34, 38, 308, 312, 322; 292/256.6, 256.63, 256.65, 257

See application file for complete search history.

(56) References Cited

U.S. PATENT DOCUMENTS

| | | | | | |
|---|---|---|---|---|---|
| 1,533,875 | A | * | 4/1925 | McCleary | 220/324 |
| 1,761,157 | A | * | 6/1930 | Schellin | 285/34 |
| 2,001,244 | A | * | 5/1935 | Ezell | 285/34 |
| 2,463,179 | A | * | 3/1949 | Iftiger, Sr. | 285/34 |
| 3,002,365 | A | * | 10/1961 | Liljequist | 464/32 |
| 4,066,330 | A | * | 1/1978 | Jones | 359/503 |
| 4,114,933 | A | * | 9/1978 | Jankelewitz et al. | 292/37 |
| 4,768,909 | A | * | 9/1988 | Warkotsch | 411/433 |
| 5,707,340 | A | * | 1/1998 | Hipp et al. | 600/112 |
| 5,755,544 | A | * | 5/1998 | Muller et al. | 411/433 |

(Continued)

FOREIGN PATENT DOCUMENTS

| | | |
|---|---|---|
| DE | 29920499 U1 | 2/2000 |
| WO | 2009080641 A1 | 7/2009 |

OTHER PUBLICATIONS

German Office Action dated May 15, 2012 issued in German Appln. No. 10 2011 076 009.

*Primary Examiner* — Daniel Wiley
(74) *Attorney, Agent, or Firm* — Carter, DeLuca, Farrell & Schmidt, LLP

(57) ABSTRACT

A plug-type mounting is provided for separably connecting an equipment element to a substructure that includes a retainer and a plug element, wherein an interlocking device for engaging the plug element with the retainer is assigned to the retainer and the plug element includes a retaining bolt with a rear bolt ring surface for cooperating with the interlocking device, and wherein the interlocking device includes at least one sliding segment with an arc-shaped interlocking surface.

10 Claims, 3 Drawing Sheets

(56) References Cited

U.S. PATENT DOCUMENTS

| | | |
|---|---|---|
| 6,443,679 B1 | 9/2002 | Schwarz |
| 7,297,015 B1 * | 11/2007 | Desrosiers et al. ........... 439/377 |
| 2006/0083582 A1 * | 4/2006 | Balsells ........................ 403/325 |
| 2010/0303542 A1 | 12/2010 | Costabel |
| 2010/0327716 A1 * | 12/2010 | Li ................................. 312/294 |
| 2011/0318091 A1 | 12/2011 | Costabel et al. |

* cited by examiner

PLUG-TYPE MOUNTING

TECHNICAL FIELD

The invention pertains to a plug-type mounting for separably connecting an equipment element to a substructure.

BACKGROUND OF RELATED ART

A plug-type mounting of this type is described, e.g., in WO 2009/080641 A1. This mounting features a retainer for being connected to a substructure and a plug element for being connected to an equipment element to be arranged on the substructure. For example, the substructure may consist of a primary structure of an aircraft fuselage and the equipment element may consist of an interior trim panel on the cabin side. The retainer carries an interlocking device for separably engaging the plug element with the retainer and the plug element features a retaining bolt with a rear bolt ring surface for cooperating with the interlocking device. The interlocking device has a slide with a rectangular opening for receiving the retaining bolt and an outer edge region that forms a linear interlocking surface, on which the retaining bolt engages with a rear bolt ring surface in an interlocking position. In this solution, it is disadvantageous that the bolt ring surface and the interlocking surface only form a small overlapping area such that only low forces can be transmitted. In order to reliably and resiliently connect the interior trim panel, the plug-type mounting therefore has to be realized in a correspondingly massive and large fashion. Plug-type mountings with an identical or at least comparable slide are described in publications DE 10 2008 34 131 A1, DE 10 2009 011 904 and DE 10 2009 12 000 A1.

It is the objective of the invention to develop a plug-type mounting for separably connecting an equipment element to a substructure that eliminates the above-described disadvantages and makes it possible to transmit high forces with a small constructive design.

SUMMARY

This objective is attained with a plug-type mounting with the characteristics of claim 1.

An inventive plug-type mounting for separably connecting an equipment element to a substructure has a retainer and a plug element, wherein an interlocking device for engaging the plug element with the retainer is assigned to the retainer and the plug element features a retaining bolt with a rear bolt ring surface for cooperating with the interlocking device. According to the invention, the interlocking device features at least one sliding segment with an arc-shaped interlocking surface.

In its interlocking position, the inventive plug-type mounting forms a large force transmission area between the retainer and the plug element because the interlocking surface overlaps the bolt ring surface at least over an arc angle. In comparison with the above-described known plug-type mounting, the inventive solution therefore can be realized smaller or more compact in order to transmit the same loads or transmit high forces with a small constructive design, respectively.

In order to further increase the loads to be absorbed, a plurality of sliding segments with an arc-shaped interlocking surface may be provided.

The load capacity can be further increased if the sliding segments form an interlocking ring surface in an interlocking position. Since the interlocking ring surface and the bolt ring surface therefore extend concentric to one another, the largest possible overlap with the bolt ring surface and consequently also a symmetric and uniform load on the retaining bolt can be achieved.

In order to clearly define the interlocking position, it is advantageous if the sliding segments laterally contact one another in the interlocking position.

Automatic interlocking of the plug element in the retainer can be achieved by prestressing the sliding segments into the interlocking position. Consequently, a separate safety mechanism for securing the sliding segments in the interlocking position is not required.

The installation of the plug-type mounting can be realized easier and, in particular, faster if the interlocking device features a self-supporting frame for being inserted into the retainer. In order to prevent changes in the position of the frame, its position in the retainer is fixed. This may be realized, e.g., with a corresponding outer contour of the frame and a corresponding inner contour of the retainer or with at least one, e.g., radial and tangential safety pin that secures the frame against rotating. The safety pin can be manufactured at the same time as the retainer and already prepared, for example, with receptacles for receiving prestressing elements for the sliding segments.

In order to displace the sliding segments, an actuating device may be provided that features a rotatable oblong hole disk with a plurality of oblong holes and a plurality of pins for being respectively guided in one of the oblong holes, wherein an oblong hole and a pin are respectively assigned to each sliding segment. The actuating device makes it possible to convert a rotatory motion into a translatory motion and therefore to radially move apart the sliding segments with a minimal number of parts. The actuating device may be controlled by means of a hand lever or by means of a remote release such as a cable control that engages on the oblong hole disk.

In order to prevent the sliding segments from tilting or drifting during the displacement, a radial guidance system may be provided for guiding the sliding segments during a sliding motion.

In order to prevent the retaining bolt from being structurally weakened in order to form the bolt ring surface, it is advantageous if the retaining bolt features a radially widened head section for forming the bolt ring surface. If the retaining bolt has a sufficiently large outside diameter, it would naturally also be conceivable to produce a circumferential notch or an annular groove in order to form the bolt ring surface.

In order to securely close the sliding segments or to securely transfer the sliding segments from a release position into the interlocking position, the sliding segments should be prevented from colliding with the head section such that the respective sliding motion is blocked. Such a blocking collision of the sliding segments with the head section of the retaining bolt in the interlocking device can be prevented, e.g., in that the head section is beveled in the rear outer edge region. The interlocking ring surface may additionally or alternatively feature a chamfered outer edge region.

The insertion of the retaining bolt into the interlocking device can be simplified if the head section features a beveled ring face.

In a preferred exemplary embodiment, three sliding segments that have the same size and therefore respectively span an arc angle of 120° are provided in order to form the interlocking ring surface. The three sliding segments make it possible to realize a large opening cross section and therefore the fastest release possible of the retaining bolt from the interlocking position with a small displacement. In addition, the diversity of parts is reduced due to the identical design of the sliding segments.

Other advantageous exemplary embodiments of the invention form the objects of the dependent claims.

BRIEF DESCRIPTION OF THE DRAWINGS

A preferred exemplary embodiment of the invention is described in greater detail below with reference to highly simplified schematic drawings. In these drawings.

DETAILED DESCRIPTION

Figure 1:
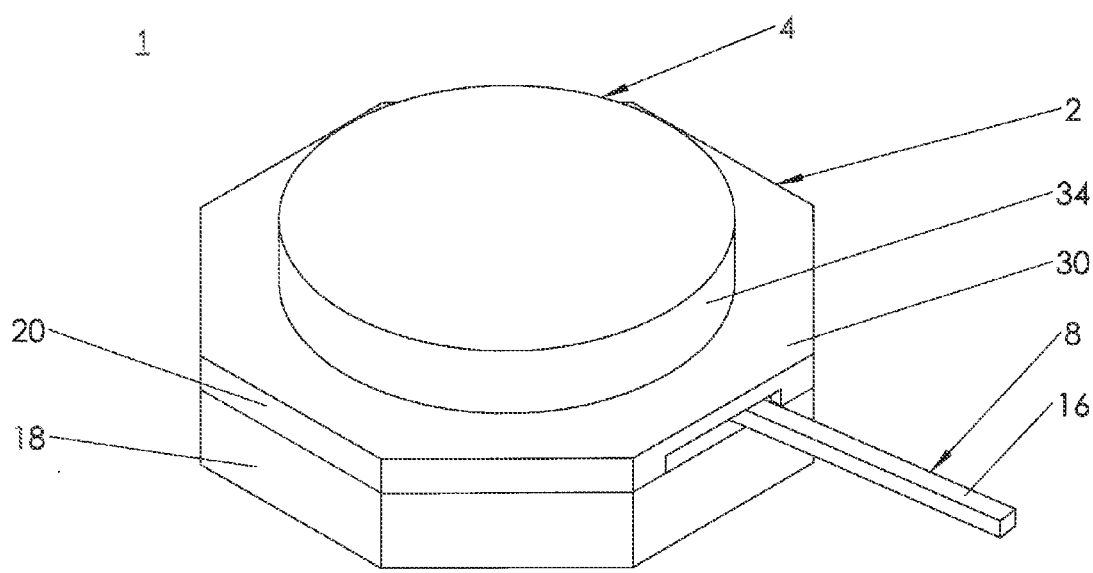
FIG. 1 shows a perspective top view of an inventive plug-type mounting in the installed state.
Figure 2:
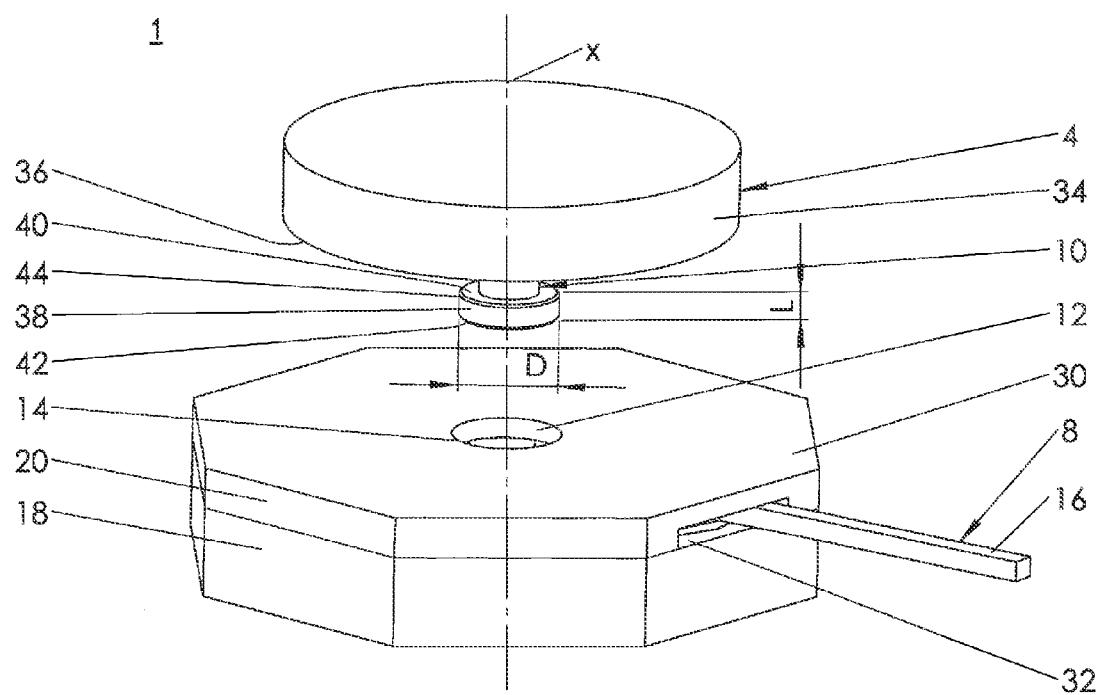
FIG. 2 shows the non-installed plug-type mounting in the prestressed interlocking position.

FIGS. 1 and 2 show an inventive plug-type mounting 1 for separably connecting an equipment element such as an interior trim panel on the cabin side to a substructure such as a primary structure of an aircraft fuselage. The plug-type mounting 1 has a longitudinal axis x that defines an installation and removal direction, as well as a retainer 2, a plug element 4, an interlocking device 6 (FIG. 3) and an actuating device 8. For reasons of simplicity, the installation and removal direction is referred to as inserting direction below. The retainer 2 is preferably mounted on the primary structure and the plug element 4 is preferably mounted on the interior trim panel.

The plug element 4 has a retaining bolt 10 that can be guided into an interior 14 of the retainer 2 through a frontal opening 12. The interlocking device 6 for separably engaging the retaining bolt 10 is arranged in the interior 14 of the retainer 2. In order to separate the interlocked retaining bolt 10 and to thusly remove the plug element 4 from the retainer 2, the interlocking device 6 is transferred from its interlocking position into a release position by means of the actuating device 8 that is also arranged in the interior 14 of the retainer 2 and controlled by means of an outwardly extending lever 16.

The retainer 2 has a cup-like base element 18 in order to define the interior 14 and a cover element 20 that is detachably connected to the base element 18 and serves for closing the interior 14.

Figure 3:
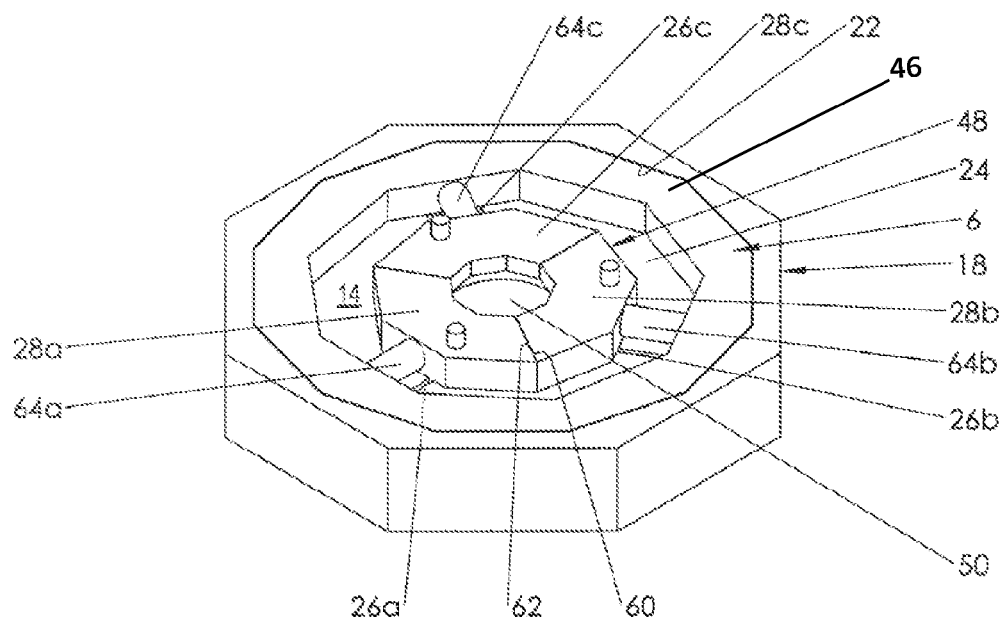
FIG. 3 shows a perspective representation of an installed interlocking device of the plug-type mounting.
Figure 4:
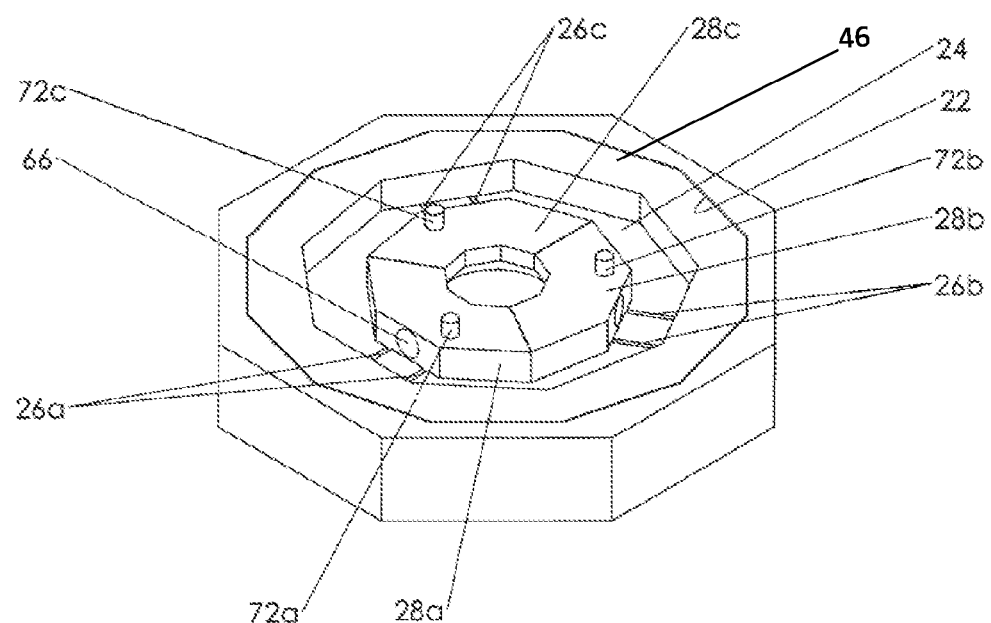
FIG. 4 shows a detailed view of the interlocking device.

According to FIGS. 3 and 4, the base element 18 has a circumferentially closed polygonal side wall 22 and a circular bottom wall 24, from which the side wall 22 extends and which features the three guide rail pairs 26a, 26b, 26c of a radial guidance system for respectively guiding one sliding segment 28a, 28b, 28c of the interlocking device 6 during a sliding motion thereof. The guide rail pairs 26a, 26b, 26c respectively feature two guide rails that respectively extend parallel to an imaginary radial line. In the exemplary embodiment shown, the parallel guide rails of the guide rail pairs 26a, 26b, 26c are realized in the form of grooves.

The cover element 20 has a disk-shaped ceiling wall 29 that is not illustrated and contains the frontal opening 12 for inserting the retaining bolt 10 as illustrated in FIG. 2. The frontal opening 12 has a circular shape and centrally extends around the longitudinal axis x. In addition to the frontal opening 12, the ceiling wall forms a contact surface 30, on which the plug element 4 abuts with a radial collar 34 in the engaged state. The cover element 20 furthermore has a not-shown side wall that extends from the ceiling wall 29 and contains a circumferential opening 32 for leading through the lever 16 of the actuating device 8, wherein the cover element 20 axially lies on the side wall 22 of the base element 18 with the aforementioned side wall. If the base element 18 has a correspondingly elevated side wall 22, the cover element 20 naturally may also be realized in a plate-shaped fashion and therefore without side wall. In such an exemplary embodiment, the circumferential opening 32 is arranged in the elevated side wall 22 of the base element 18.

According to FIG. 2, the plug element 6 features the retaining bolt 10 that is connected to an axial surface 36 of the radial collar 34 connected to the interior trim panel on its bottom side and features a radially widened plate-shaped or mushroom-shaped head section 38 for engaging with the interlocking device 6. The head section 38 defines a bolt ring surface 40 that is oriented in the direction of the radial collar 34 and therefore forms a rear bolt ring surface viewed in the inserting direction that extends orthogonal to the longitudinal axis x of the plug-type mounting 1. Since the longitudinal axis x of the retaining bolt 10 defines the inserting direction, the bolt ring surface 40 also extends orthogonal to the inserting direction. In order to open the sliding segments 28a, 28b, 28c during the insertion of the retaining bolt 10, the head section 38 features a conical annular face 42 that points in the inserting direction and therefore is arranged opposite to the bolt ring surface 40. In order to simplify the closing of the sliding segments 28a, 28b, 28c after the insertion of the retaining bolt 10, the bolt ring surface 40 or the head section features a chamfered rear outer edge region 44.

The interlocking device 6 is arranged in the interior 14 of the retainer 2 and, according to FIG. 3, features a self-supporting annular frame 46 for being inserted into the base element 18. The frame 46 naturally may also be realized integrally with the side wall 22 or be formed by this side wall, respectively. The frame 46 has a polygonal outer contour that is positively engaged with the side wall 22 such that the frame 46 is secured against rotating about the longitudinal axis x.

The sliding segments 28a, 28b, 28c are arranged within the frame 46. In the exemplary embodiment shown, three sliding segments 28a, 28b, 28c are provided and form a closed interlocking ring 48 with a central insertion opening 50 in the interlocking position. The insertion opening 50 is realized concentric to the frontal opening 12 in the installed state of the plug element 10 and has an inside diameter d that is smaller than an outside diameter D of the head section 38.

Figure 5:
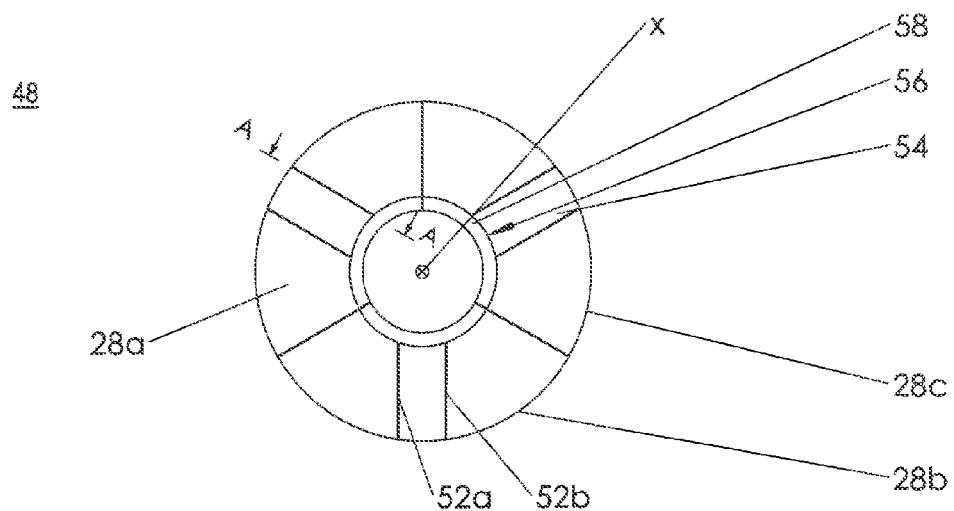
FIG. 5 shows a bottom view of the interlocking ring illustrated in FIG. 3.

The sliding segments 28a, 28b, 28c are realized identically and respectively span an arc angle of 120°. They are radially guided in the guide rail pairs 26a, 26b, 26c of the guidance system that define a sliding plane and for this purpose respectively feature two parallel guide webs 52a, 52b that are realized on the underside 54 facing the bottom wall 24 as illustrated in the bottom view according to FIG. 5. The two guide webs 52a, 52b respectively extend parallel to an imaginary radial line that centrally extends through the respective sliding segment 28a, 28b, 28c. In order to ensure a low-friction guidance, the sliding segments 28a, 28b, 28c are guided in the guide rail pairs 26a, 26b, 26c in such a way that they are respectively spaced apart from the bottom wall 24.

In the interlocking position, the sliding segments 28a, 28b, 28c form a closed interlocking ring surface 56 (FIG. 5) for the planar abutment of the bolt ring surface 40, wherein said interlocking ring surface faces the bottom wall 24 and points in the inserting direction. In the installed state of the plug element 4, the interlocking ring surface 56 extends concentric to the bolt ring surface 40 and has an inside radius and an outside radius that at least essentially correspond to the inside and outside radius of the bolt ring surface 40 in order to realize the largest possible overlap. The respective inside and outside radii plotted from the longitudinal axis x are preferably identical. In order to form the interlocking ring surface 56, the sliding segments 28a, 28b, 28c respectively feature an arc-shaped interlocking surface 58, the arc of which corresponds to that of the bolt ring surface 40.

Figure 6:
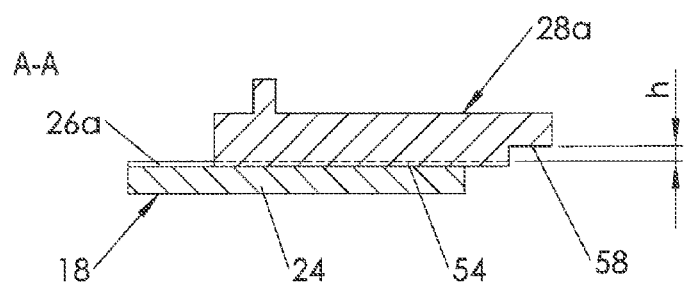
FIG. 6 shows a section through a sliding segment illustrated in FIGS. 3 and 4.
Figure 7:
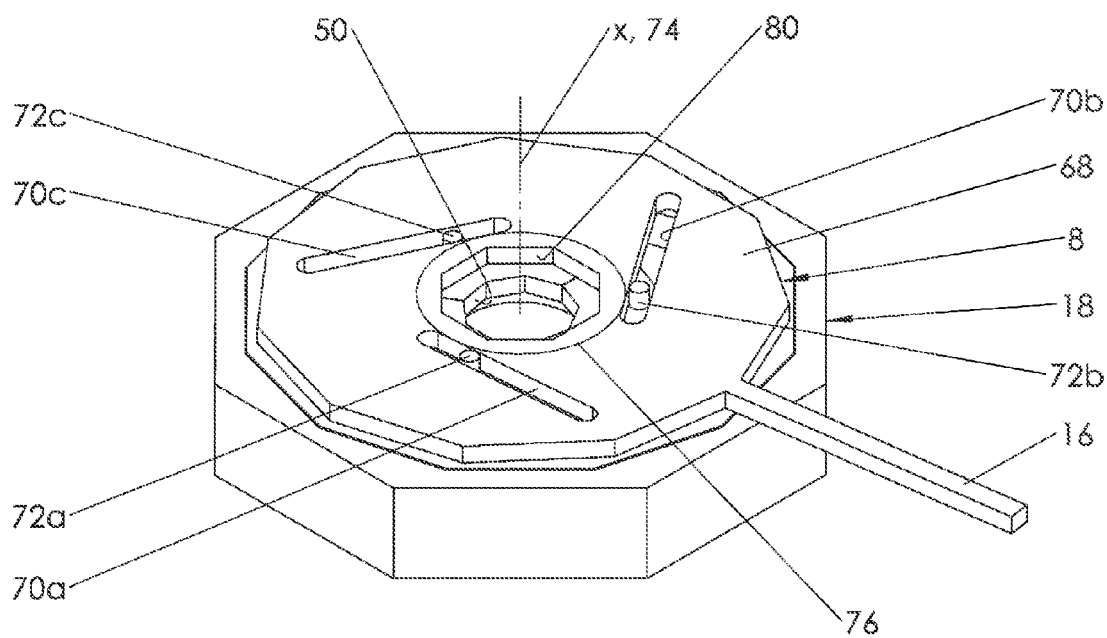
FIG. 7 shows a perspective representation of an installed actuating device of the plug-type mounting.

According to FIG. 6, the interlocking surfaces 58 are realized on the side of the inner wall in the region of the underside 54 by means of a radial back-step such that the insertion opening 50 is quasi radially widened. The interlocking ring surface 56 defines an interlocking plane that extends parallel to the sliding plane and orthogonal to the inserting direction. In order to prevent the head section 38 from colliding with the bottom wall 24 such that the interlocking ring 48 cannot close and an engagement is not possible, the sliding segments 28a, 28b, 28c have a height h in the region of the back-steps that is greater than the axial length L of the head section 38. Alternatively, the bottom wall 24 may also contain a depression, into which the face of the head section 38 penetrates.

In order to define the interlocking position, the sliding segments 28a, 28b, 28c respectively have two lateral surfaces 60, 62 that face apart from one another and are illustrated, for example, on the two sliding segments 28a, 28b in FIG. 3, wherein these lateral surfaces abut one another in the interlocking position and thusly define a radially inner position of the sliding segments 28a, 28b, 28c. In order to laterally support the sliding segments 28a, 28b, 28c in the interlocking position, a not-shown positive connection such as a tongue-and-groove connection may be respectively realized in the adjacent lateral surfaces 60, 62 and separably engaged in the interlocking position.

According to FIG. 3, a tubular tensioning element such as a spring 64a, 64b, 64c may be respectively provided for prestressing the sliding segments 28a, 28b, 28c into the interlocking position. The springs 64a, 64b, 64c are oriented in the sliding direction of the respective sliding segments 28a, 28b, 28c and respectively arranged between the parallel guide rails of the guide rail pairs 26a, 26b, 26c. On the side of the inner wall, they are supported on the frame 46 and engage on a not-shown bore base of a rear segment bore 66 (FIG. 4).

According to 7, the actuating device 8 is positioned in the interior 14 of the retainer 2 between the interlocking device 6 and the cover element 20 and features a rotatable oblong hole disk 68 with a plurality of oblong holes 70a, 70b, 70c, as well as a plurality of pins 72a, 72b, 72c on the side of the sliding segments for being guided in the oblong holes 70a, 70b, 70c. The oblong hole disk 68 can be pivoted about a rotational axis 74 that is defined by the longitudinal axis x of the plug-type mounting 1. Three oblong holes 70a, 70b, 70c are provided in accordance with the number of sliding segments 28a, 28b, 28c, wherein said oblong holes are respectively assigned to one of the sliding segments 28a, 28b, 28c and respectively extend in the transverse direction of the respective guide rail pair 26a, 26b, 26c. This results in a triangular arrangement of the oblong holes 70a, 70b, 70c in the oblong hole disk 68 that is tangentially positioned on an imaginary circle 76 arranged concentric to the interlocking ring surface 56 and the bolt ring surface 40.

Three pins 72a, 72b, 72c are provided in accordance with the number of sliding segments 28a, 28b, 28c and in accordance with the number of oblong holes 70a, 70b, 70c, wherein said pins respectively extend orthogonally from an upper side 78 of the sliding segments 28a, 28b, 28c that carries the oblong hole disk 68 as illustrated in FIG. 4.

In order to lead through the retaining bolt 10, the oblong hole disk 68 has a central through-opening 80 that consequently is arranged concentric to the insertion opening 50 in the installed state.

The actuating device 8 furthermore features the control lever 16 that extends radially outward.

In order to respectively install or connect an interior trim panel on/to a primary structure of an aircraft fuselage, the retainers 2 are initially mounted on the primary structure and the plug elements 4 are mounted on the interior trim panel. Subsequently, each plug element 4 is inserted into the respective retainer 2 through the respective frontal opening 12 with its retaining bolt 10. Since the outside diameter D of the head section 38 is larger than the inside diameter d of the insertion opening 50, the head section 38 collides with the sliding segments 28a, 28b, 28c that are prestressed into the interlocking position with its annular face 42 and presses these sliding segments radially outward. The interlocking ring 48 is opened and the interlocking ring surface 56 is divided into its individual interlocking surfaces 58. After the penetration of the head section 38 into the individual back-steps of the sliding segments 28a, 28b, 28c on the side of the inner wall, they are moved radially inward due to the prestress of the springs 64a, 64b, 64c and therefore returned into the interlocking position. The interlocking ring 48 is closed and the individual interlocking surfaces 68 form the interlocking ring surface 56 that circumferentially encompasses the retaining bolt 10 and on which the bolt ring surface 40 abuts in a planar fashion and the head section 38 therefore abuts quasi over its entire ring cross section. The plug element 4 is now reliably connected to the retainer 2. In order to allow an engagement of the plug element 4 without tolerances, an axial distance of the bolt ring surface 40 from the radial collar 34 on the bottom side approximately corresponds to the distance of the interlocking ring surface 56 from the contact surface 30 of the cover element 20 that faces the plug element 4. Corresponding damping elements naturally may be provided for damping purposes. These damping elements may consist, e.g., of elastic annular disks that are arranged between the cover element 20 and the radial collar 34 such that the distance of the interlocking ring surface 56 from the contact surface 30 is increased, wherein this aspect has to be correspondingly taken into consideration.

In order to remove the interior trim panel and therefore disengage the interlocked elements, the interlocking device 6 can be transferred from the interlocking position into the release position. This is realized by pivoting the lever 10 about the rotational axis 74. The rotatory motion is transmitted to the sliding segments 28a, 28b, 28c by means of the pins 72a, 72b, 72c guided in the oblong holes 70a, 70b, 70c such that they carry out a transverse sliding motion radially outward along their guide rail pairs 26a, 26b, 26c. The interlocking ring 48 is opened in such a way that the head section 38 can be guided through the insertion opening 50 and the plug element 4 can be pulled out of the retainer 2. After disengaging the plug element 4 from the retainer 2, the lever 10 is released and the sliding segments 28a, 28b, 28c return into the interlocking position due to the prestress that is directed radially inward.

For reasons of completeness, it should be noted that the design of the retainer 2 shown and, in particular, the interlocking device 6 with the sliding segments 28a, 28b, 28c and the oblong hole disk 68 of the actuating device 8 in the form of a polygon should merely be interpreted in an exemplary fashion. As indicated in the bottom view of the sliding segments 28a, 28b, 28c in FIG. 5, the plug-type mounting 1 or its elements 2, 18, 20, 6, 28a, 28b, 28c, 46, 8, 68 is/are preferably realized with a circular inner contour and outer contour and therefore comparably to the outer contour of the radial collar 34 of the plug element 4. However, in order to prevent rotatory motions of the interlocking device 6 during the control of the actuating device 8, the frame 6 needs to be correspondingly secured against rotatory motions if it has a circular outer contour. This may be realized, e.g., with a local tangential flattening of the outer contour of the frame 46, with a corresponding flattening of the inner contour 22 of the retainer 2, with a safety projection, with a safety pin and the like.

The invention discloses a plug-type mounting for separably connecting an equipment element to a substructure that features a retainer and a plug element, wherein an interlocking device for engaging the plug element with the retainer is assigned to the retainer and the plug element features a retaining bolt with a rear bolt ring surface for cooperating with the interlocking device, and wherein the interlocking device features at least one sliding segment with an arc-shaped interlocking surface.

The invention claimed is:

1. A plug-type mounting for separably connecting an equipment element to a substructure, comprising:
   - a retainer including a base element having a plurality of radial guide rail pairs extending radially from a center portion of a bottom wall of the base element;
   - a plurality of sliding segments, each sliding segment slidably engaged with a respective pair of the plurality of radial guide pairs, each sliding segment having an arc-shaped interlocking inner surface;
   - an actuating device including a rotatable disk with a plurality of oblong holes extending tangential to a central insertion opening in the disk, and each oblong hole engaging with an upper portion of each of the sliding segments; and
   - a plug element insertable through the central insertion opening of the disk, towards the central portion of the base element, and comprising a retaining bolt with a rear bolt ring surface; wherein
   - in an open position, the sliding segments are moved to a radially outward position on the radial guide pairs; and
   - in an interlocking position, the rear bolt ring surface of the retaining bolt is moved into the center portion of the base element and axially past the sliding segments, whereby the retaining bolt is axially fixed behind the sliding segments.

2. The plug-type mounting of claim 1, wherein the arc-shaped interlocking inner surfaces of the plurality of sliding segments form an interlocking ring surface in the interlocking position.

3. The plug-type mounting of claim 1, wherein the plurality of sliding segments laterally contact one another in the interlocking position.

4. The plug-type mounting of claim 1, wherein the plurality of sliding segments are prestressed into the interlocking position.

5. The plug-type mounting of claim 1, wherein the base element includes a self-supporting frame for being inserted into the retainer.

6. The plug-type mounting of claim 1, wherein the upper portion of each sliding segment comprises a pin for being respectively guided in one of the oblong holes.

7. The plug-type mounting of claim 1, wherein the retaining bolt includes a radially widened head section in order to form the rear bolt ring surface.

8. The plug-type mounting of claim 7, wherein the radially widened head section is beveled in a rear outer edge region.

9. The plug-type mounting of claim 7, wherein the radially widened head section includes a beveled annular face for insertion of the retaining bolt.

10. The plug-type mounting of claim 1, wherein the plurality of sliding segments comprises three sliding segments of identical size.

\* \* \* \* \*